Patented Sept. 6, 1949

2,481,036

UNITED STATES PATENT OFFICE 2,481,036

ALPHA-HALOGENATED KETO FATTY COMPOUNDS

Donald Price, New York, N. Y., and Francis J. Sprules, Arlington, N. J., assignors to Nopco Chemical Company, Harrison, N. J., a corporation of New Jersey No Drawing. Application November 24, 1943, Serial No. 511,594

4 Claims. (Cl. 260—408)

This invention relates to alpha-halogenated higher keto fatty acids and esters and to a method for preparing the same.

It has been discovered by this invention that keto fatty acids containing from 8 to 30 carbon atoms, and esters thereof, will react with elementary chlorine or bromine, splitting out hydrogen halide and yielding a compound in which the halogen is susbtituted at positions alpha to the keto group. The reaction tends normally to the formation of $\alpha\alpha'$ dihalo compounds, in which the carbon atoms vicinal to the keto groups each bear one halogen atom. However, under conditions of restrained halogenation, it is possible to confine the halogenation to only one of the alpha carbons. Conversely, under drastic conditions of chlorination, it is possible to force the introduction of three and even four halogen atoms at positions alpha to the keto groups. The products are useful in themselves as additives to lubricants, rust-preventing compositions, and the like, and further serve as useful intermediates in the production of more complex substances.

Referring to the higher fatty keto acids and esters employed as starting materials in the reactions of this invention, these may be any fatty acids or esters, the acyl chains of which contain from 8 to 30 carbon atoms, at least one of said carbon atoms being ketonic. Examples of suitable higher fatty keto acids include for example, 12-ketostearic acid; 4-ketostearic acid; 9-ketostearic acid; 10-ketostearic acid; 13-ketobehenic acid; 14-ketobehenic acid; 9-chlor, 10-ketostearic acid, the acids derived from castor oil which has been hardened and subsequently dehydrogenated, either by oxidation or catalytically; and the like. Examples of suitable esters include esters of acids above indicated as suitable, with aliphatic aralihpatic or aromatic hydroxy compounds, such as methanol, glycerol, benzyl alcohol, etc.; natural glyceride oils which have been treated to develop keto groups in the acyl chains thereof; and the like.

As set forth hereinabove, the only halogens suitable for use in this invention are chlorine and bromine. It is well known that fluorine tends to oxidize, rather than to fluorinate, organic compounds. In the case of iodination, the hydrogen iodide evolved tends to reduce off any iodine which may have become substituted in the fatty compound.

The halogenation reaction of this invention is best conducted by slowly introducing the selected halogen into the selected fatty keto compound at a suitable rate. Cooling should be applied where it is necessary to keep the temperature of the reaction mass below the temperatures at which undesired side reactions occur as hereinafter set forth. Preferably, but not necessarily, the keto compound during this operation should be in solution in an inert organic solvent such as chloroform, carbon tetrachloride, hexane, petroleum ether, or the like. However, the keto acid may alternatively be simply melted. If chlorine is used as the halogenating agent, it is best introduced by bubbling gaseous chlorine through a solution or through a molten mass of the keto compound. Bromine may similarly be introduced as a vapor, but most conveniently is supplied as a solution thereof in an inert organic solvent. The temperature of the mass during the reaction should be maintained as low as is consistent with a reasonable rate of reaction, as extremely high temperatures encourage the formation of undesired by-products. In general, maintenance of temperatures between about −20° and 100° C., and preferably between about 0° and about 75° C., will secure these results. Under these conditions, the reaction will proceed to the formation of the $\alpha\alpha'$ dichlor keto fatty compounds in from 1 to 8 hours, when chlorine is employed as the halogen. In the case of bromine, the rate of addition is limited only by the necessity of keeping the reaction mass at a sufficiently low temperature to avoid formation of undesired by-products, and hence is determined by the efficiency of the cooling arrangements. The completion of the reaction to the di-halo stage may be readily observed by periodic analysis of the reaction mass and the rapidly increasing reluctance of the fatty material to take up halogen. To force the reaction beyond the $\alpha\alpha'$ dihalo stage requires prolongation of the reaction considerably beyond the time when the dihalo stage is reached.

The $\alpha\alpha'$ dihalo keto compounds of this invention present two asymmetric carbon atoms, and accordingly will occur in four stereoisomeric forms comprising two pairs of optical antipodes. It has usually been found possible in the practice of this invention to separate a dl-mixture of one pair of optical antipodes from a dl-mixture of other pairs by recrystallization from solvents.

The α-halo keto fatty compounds of this invention have been found suitable in themselves for a wide variety of uses, for instance as additives to lubricants for pour point lowering, imparting E. P. properties, increasing the wetting and adhesive power, and the like, as constituents of rust proofing compositions, and many other uses. Moreover, the compounds of this invention, by virtue of their multi-functional reactivity, viz., at the keto groups, at the α-halogen attachments, and at the carboxylic, hydroxy, and ester groups, present highly attractive possibilities as intermediates in the synthesis of more complicated compounds.

With the foregoing discussion in mind, there are given herewith detailed specific examples for the practice of this invention. All parts given are by weight.

EXAMPLE I

*11-13 dichloro, 12-ketostearic acid*

| | |
|---|---|
| 12-ketostearic acid | 25 parts (1 mol) |
| Chlorine gas | 31 parts (5.2 mols) |
| Carbon tetrachloride | 40 parts |

The carbon tetrachloride was warmed and the 12-keto acid dissolved therein. The temperature of the solution was adjusted to 20° C. and maintained at this temperature while the chlorine was introduced at a slow rate, 6 hours being required for the addition of all the chlorine. The chlorinated solution was permitted to stand at 0° C. overnight. The solution was then subjected to a vacuum to remove the free chlorine therein and then distilled to evaporate off the solvent. The chlorine content of the resultant syrupy product was 19.3% (theory 19.4% for dichloro ketostearic acid).

EXAMPLE II

*11-13 dichlor 12-ketostearic acid*

| | |
|---|---|
| 12-ketostearic acid | 10 parts (1 mol) |
| Chlorine gas | 6 parts (2.51 mols) |
| Petroleum ether | 30 parts |

The procedure of Example 1 was precisely repeated using the reagents listed above in place of the corresponding reagents in said example. The product had a chlorine content of 19.12 per cent (theory 19.4%).

EXAMPLE III

*11-13 dichlor 12-ketostearic acid*

Ten parts of 12-ketostearic acid were melted and chlorine passed therethrough. After about one-fourth of the theoretical amount of chlorine had been introduced, it became possible, without solidifying the mass, to lower the temperature thereof from the rather elevated temperature required to effect original fusion of the 12-ketostearic acid, and chlorination was continued until a slight excess had been taken up. The reaction mixture was subjected to vacuum to remove the gases, yielding the 12.4 parts of product (theory for dichlor ketostearic acid 12.4 parts).

EXAMPLE IV

*Dichlor 13- and 14-ketobehenic acids*

| | |
|---|---|
| Mixed 13- and 14-ketobehenic acids | 5 parts (1 mol) |
| Chlorine gas | 5.5 parts (5.5 mols) |
| Petroleum ether | 16 parts |

The acids were dissolved in the petroleum ether and the chlorine gas bubbled into the solution over a period of 3 hours. The solution was then washed twice with 50-part portions of a 10% aqueous sodium chloride solution, after which the washed non-aqueous phase was freed of solvent by distillation. A residual syrup was obtained having a chlorine content of 17.04%. This product was recrystallized from petroleum ether at —7° C., the recrystallized product having a chlorine content of 16.50% (theory for dichlor ketobehenic acid, 16.78%).

EXAMPLE V

*Dichlor 9- and 10-ketostearic acids*

| | |
|---|---|
| Mixed 9- and 10-ketostearic acids | 50 parts (1 mol) |
| Chlorine gas | 59 parts (5 mols) |
| Petroleum ether | 153 parts |

The keto acids were dissolved in the petroleum ether and the solution adjusted to and maintained at 42° C. The chlorine was then introduced into this solution at temperatures in the range of 32°–52° C., the addition requiring a total of 4 hours. The solution was then washed with two 100-part portions of 10% aqueous sodium chloride solution and the washed non-aqueous phase subjected to distillation to remove the solvent therefrom, leaving a product having a chlorine content of 19.20% (theory 19.35%).

EXAMPLE VI

*3-5 dichlor 4-ketostearic acid*

| | Parts |
|---|---|
| 4-ketostearic acid | 5 |
| Chlorine gas: | |
| 1st portion | 2.5 |
| 2d portion | 3.5 |
| 3d portion | 2.6 |
| Chloroform | 67 |

The keto acid was dissolved in the chloroform and the first portion of the chlorine passed thereinto at room temperature. The solution was then cooled at 8° C. and the second portion of chlorine was passed in and the solution was then placed in a stoppered bottle and allowed to stand for 12 hours at 8° C. Analysis of a small sample indicated incomplete chlorination and accordingly, the third portion of chlorine was passed in over a period of 4 hours. The solution was then shaken with a 40% aqueous sodium bisulphite solution and then distilled to remove the chloroform, leaving a product containing 19.30% of chlorine (theory 19.35%).

EXAMPLE VII

*Trichloro 12-ketostearic acid*

| | |
|---|---|
| 12-ketostearic acid | 50 parts (1 mol) |
| Chlorine gas | 120 parts (10 mols) |
| Petroleum ether | 152 parts |

The keto acid was dissolved in the petroleum ether and the chlorine gas was introduced into the solution over a period of 13 hours. The solution was then washed with two 100-part portions of 10 per cent aqueous sodium chloride solution and the non-aqueous layer was freed of the petroleum solvent by distillation, leaving a product containing 27.1% of chlorine (theory 26.54%).

EXAMPLE VIII

*Chlorination product of 12-ketostearic acid*

| | Parts |
|---|---|
| Trichloro 12-ketostearic acid (prepared as described in preceding example) | 34 |
| Chlorine gas | 150 |
| Carbon tetrachloride | 100 |

The keto acid was dissolved in the petroleum ether and the chlorine bubbled therethrough at room temperature over a period of 18 hours. The solution was then washed with two 100-part portions of 10 per cent aqueous sodium chloride solution and the non-aqueous layer was subjected to distillation to remove the carbon tetrachloride, leaving a product containing 32.6% chlorine (theory 35.57% chlorine for the tetrachloro compound).

EXAMPLE IX

*dl 11-13 dibromo 12-ketostearic acids*

| | |
|---|---|
| 12-ketostearic acid | 10 parts (1 mol) |
| Bromine (as a solution containing 0.156 g. bromine/ml.) | 53 parts (2 mols) |
| Chloroform | 53 parts |

The 12-ketostearic acid was dissolved in the chloroform and the bromine solution slowly added thereto. The red color of the bromine disappeared rapidly during the addition of the bromine solution and hydrogen bromide was liberated. The solution was then washed twice with 100-part portions of a 10% aqueous sodium chloride solution. The non-aqueous layer was subjected to distillation to remove the chloroform, leaving 15.4 parts of a syrupy product (theory for dibromo ketostearic acid 15.3 parts).

This first brominated product was then fractionated into 2 dl mixtuers as follows:

The crude product was dissolved in 30 parts of petroleum ether and chilled to −17° C. A white solid (hereinafter designated fraction A) precipitated and was separated from the mother liquor (hereinafter designated B) by filtration. The solid product A was recrystallized from petroleum ether, yielding 6.5 parts of material (hereinafter designated A-1) having a melting range of 39-41° C. The mother liquor B was evaporated to yield a syrupy product (hereinafter designated B-1) which solidified at −17° C. Fractions A-1 and B-1 are apparently the two dl mixtures of 11-13 dibromo 12-keto stearic acids. The bromine in these products was highly labile since titration with alkali gave drifting end points, and solutions thereof gave positive tests for halogen with cold alcoholic silver nitrate.

EXAMPLE X

*Dibromo 13- and 14-ketobehenic acids*

| | Parts |
|---|---|
| Mixed 13- and 14-ketobehenic acids | 5 |
| Bromine (as chloroform solution containing 0.16 g./c. c.) | 4.6 |
| Chloroform | 53 |

The keto acid was dissolved in the chloroform and the bromine was slowly added thereto. Upon completion of the reaction, the chloroform solution was washed twice with 100-part portions of 10% aqueous sodium chloride solution. The washed chloroform solution was then subjected to distillation to remove the chloroform, leaving 7.7 parts of a residue containing 29.8% of bromine. This product was recrystallized from petroleum ether at −7° C., yielding a product containing 29.9% bromine (theory for dibromo ketobehenic acid, 31.2%).

EXAMPLE XI

*Dibromo 9- and 10-ketostearic acids*

| | Parts |
|---|---|
| Mixed 9- and 10-ketostearic acids | 10 |
| Bromine (as a solution containing 0.16 g./ml.) | 11.4 |
| Chloroform | 100 |

The procedure of Example X was precisely repeated using the above reagents in place of the corresponding reagents in said example, with the exception that the final recrystallization was omitted. There were obtained 15.8 parts of a crude product containing 35.05% of bromine (theory 35.09).

EXAMPLE XII

*3-5 dibromo-4-ketostearic acid*

| | |
|---|---|
| 4-ketostearic acid | 10 parts (1 mol) |
| Bromine (as a solution containing 0.156 2. bromine/ml.) | 5.3 parts (2 mols) |
| Chloroform | 53 parts |

The 4-ketostearic acid was dissolved in the chloroform and the bromine solution slowly added thereto. The red color of the bromone disappeared rapidly during the addition of the bromine solution, and hydrogen bromide was liberated. After all the bromine had been added, the solution was then shaken up with 100 parts of a 40% aqueous sodium bisulfite solution, and then washed with 100 parts of a 10% aqueous sodium chloride solution. The washed chloroform solution was then distilled to remove the chloroform, leaving a tan-colored solid residue having a bromine content of 36.14 (theory for dibromoketostearic acid, 35.09%).

The invention having been thus described, what is believed to be specifically novel, and desired to be secured by Letters Patent is:

1. A free saturated keto fatty acid containing from 8 to 30 carbon atoms and, at positions $\alpha\alpha'$ to a keto group, two halogen atoms selected from the group consisting of chlorine and bromine atoms.
2. A free 11,13 dichlor 12-ketostearic acid.
3. A free 11,13 dibromo 12-ketostearic acid.
4. A free 3,5 dichlor 4-ketostearic acid.

DONALD PRICE.
FRANCIS J. SPRULES.

REFERENCES CITED

The following references are of record in the file of this patent:

UNITED STATES PATENTS

| Number | Name | Date |
|---|---|---|
| 1,862,596 | Keller et al. | June 14, 1932 |
| 2,223,473 | Wiezevich | Dec. 3, 1940 |
| 2,227,823 | Cox | Jan. 7, 1941 |